United States Patent [19]

Eguchi et al.

[11] 4,334,226

[45] Jun. 8, 1982

[54] ANTENNA SYSTEM FOR SATELLITE COMMUNICATION

[75] Inventors: Kouichi Eguchi; Tsuguya Inoie, both of Mitaka, Japan

[73] Assignee: Japan Radio Company, Limited, Tokyo, Japan

[21] Appl. No.: 181,665

[22] Filed: Aug. 26, 1980

[30] Foreign Application Priority Data

Oct. 6, 1978 [JP] Japan .................................. 53-123762

[51] Int. Cl.$^3$ .............................................. G01S 3/42
[52] U.S. Cl. ............................ 343/100 ST; 343/117 R
[58] Field of Search ...................... 343/100 ST, 117 R

[56] References Cited

U.S. PATENT DOCUMENTS

| | | | |
|---|---|---|---|
| 2,947,986 | 8/1960 | Marner et al. | 343/117 R |
| 4,035,805 | 7/1977 | Mobley | 343/100 ST X |
| 4,156,241 | 5/1979 | Mobley et al. | 343/100 ST |

Primary Examiner—T. H. Tubbesing
Attorney, Agent, or Firm—Frishauf, Holtz, Goodman and Woodward

[57] ABSTRACT

In an antenna support device including a horizontal stabilized platform supported by two orthogonal corrective shafts and provided with a flywheel driven by a motor whose spin vector is directed at right angles to the plane of the platform, one of the corrective shafts is actively controlled in response to a tilt of the platform about the other corrective shaft, while the other corrective shaft is actively controlled in response to a tilt of the platform about said one corrective shaft, and axes of an azimuthal shaft directed at right angles to the plane of the platform for supporting an antenna from the platform and the two corrective shafts intersect with each other substantially at one point, whereby torques induced by gravity and linear acceleration may be substantially counter-balanced within almost all the movable ranges about the two corrective shafts.

9 Claims, 8 Drawing Figures

ANTENNA SYSTEM FOR SATELLITE COMMUNICATION

FIELD OF THE INVENTION

The present invention relates to an antenna system for satellite communication to be installed on a body subjected to rocking such as a vessel, oil-rig, etc., and more particularly to an antenna system of satellite tracking type for automatically tracking a geo-stationary satellite in response to gradual variation of the direction of the satellite caused by navigation of the vessel or the like.

BACKGROUND OF THE INVENTION

A number of techniques for stably directing a directional antenna towards a target under a rocking condition have been proposed mainly for use in an aircraft. In addition, since the beginning of the 1970's, a number of proposals aiming at the applications mainly for use in a marine equipment have been known. This is believed to have resulted partly from the encouragement by the fact that the MARISAT system for the maritime satellite was planned and executed in the United States. One of the features required for an antenna system for use in maritime satellite communication is that improvements in the electrical reliability as well as mechanical reliability must be provided. Since there is a tendency that this requirement be fulfilled by increasing a number of shafts in an antenna support device to reduce a movable range and a momentum for each axis, an axis assembly including three or more axes is being predominantly employed. In the case of a 4-axis assembly, the structure in which a stabilized platform is formed and an azimuth axis and an elevation axis are provided thereon, is easy to construct and is also highly practicable.

With regard to the method for forming a stabilized platform, a servo stabilization system has been heretofore known, in which a tilt angle is detected by an attitude sensor such as an inclinometer, a vertical gyro device, etc., a servo loop is assembled by combining with a servo control motor and stabilization is achieved by means of an angular velocity sensor such rate gyros, a gas rate sensor, etc. Since the beginning of the 1970's, a passive stabilization system employing gyros and a pendulum weight in combination has been proposed.

However, these two representative stabilization systems also have both an advantage and a disadvantage. In the system consisting of the combination of an attitude sensor and a servo control system, the cost of the attitude sensor and the stabilizing rate sensor is never small. Also in the passive system consisting of the combination of gyros and a pendulum weight, when the system is equipped on a vessel subjected to rocking of large amplitudes or equipped at a place remote from a center of rolling of a vessel such as a place on a mast, it is difficult to realize a compromise between the stability and the recovery to the horizontal state upon tilting of the stabilized platform.

Assuming that a horizontal stabilized platform has been supported so as to be rotatable about two axes, a description will now be made of external disturbances against the horizontal stabilized platform, by way of representative example, in connection with the case where the horizontal stabilized platform is mounted on a vessel. As representative disturbances, frictional torques transmitted from the two axes, i.e., the roll axis and pitch axis of the stabilized platform, and torques induced by linear accelerations in the case where the center of gravity of the horizontal stabilized platform is deviated, are known. As the linear accelerations, one can enumerate a linear acceleration caused by rolling or pitching, that caused by a water hammer, a gravitational acceleration, an acceleration in the direction of navigation of the vessel when it is accelerated or decelerated, vibrations caused by rotations of an engine or a screw, and the like. The accelerations caused by ordinary start, stop, acceleration and deceleration of a vessel can be neglected in most cases in a well-designed stabilized platform because they are sufficiently small.

Generally speaking, the undesirable external disturbances are torques induced by the frictions of the axes of the horizontal stabilized platform and by the linear accelerations of the rolling and pitching, water hammers and vibrations of the hull due to rotations of an engine and a screw of the vessel. These influences are generally emphasized when the antenna system is equipped on a mast or the like. These linear accelerations may act upon the horizontal stabilized platform as harmful external disturbance torques if the stabilized platform is not designed properly.

For instance, in the case of constructing the stabilized platform from the combination of gyros and a pendulum weight, when the above-mentioned various lateral linear accelerations A are exerted, the external disturbance torque exerted upon the stabilized platform is approximately equal to mAl, where m represents the mass of the pendulum weight and l represents the position of the center of gravity of the pendulum weight relative to the axis of the stabilized platform, and in some cases this torque would not be negligible.

Representing the sum of the external disturbance torques exerted upon one axis of the stabilized platform by $\vec{N}$, then the stabilized platform precesses at the following angular velocity $\vec{\Omega}$ about the other axis due to a gyro effect:

$$\vec{N} = \vec{\Omega} \times \vec{H} \tag{1}$$

where $\vec{H}$ represents an angular momentum vector about a spin axis of a gyro. When the stabilized platform is approximately in a horizontal state, the three vectors in Equation (1) above are substantially at right angles to each other, and hence they can be represented by scalar quantities, as follows:

$$N = \Omega \cdot H \tag{2}$$

Accordingly, the following relation is derived:

$$\Omega = (N/H) \tag{3}$$

If the lateral linear acceleration is represented by A, then the torque N exerted upon the pendulum weight is derived by the following equation:

$$N \approx mAl + T_f \tag{4}$$

where $T_f$ represents a frictional torque exerted upon the same axis. Therefore, the angular velcocity $\Omega$ is represented by the following equation:

$$\Omega = (N/H) \approx (mAl/H) + (T_f/H) \tag{5}$$

In the case where the tilt of the horizontal stabilized platform is small, one way consider that the precession occurs at the angular velocity Ω represented by Equation (5) above.

It is to be noted here that the first term on the right side of Equation (5) is proportional to the linear acceleration A as well as the product m·l of the pendulum weight. This means that if the product m·l of the pendulum weight is large, when the linear acceleration is large, the external disturbance torque and thus the angular velocity of the precession also become large nearly in proportion thereto, and therefore, the large product m·l is undesirable because there is a fear that the platform may become unstable due to the large accelerations caused by a large water hammer applied to the hull, vibrations of the mast and the like. On the contrary, if the product m·l of the pendulum weight for damping is made small, a damping effect for the stabilized platform becomes weak, and hence the recovery of the stabilized platform are degraded.

OBJECTS OF THE INVENTION

It is one object of the present invention to provide an antenna system for satellite communication comprising a stabilized platform which is manufactured at an intermediate cost between the costs of the above-described two representative systems and yet which is free from the disadvantage of the above-mentioned two systems.

Another object of the present invention is to provide an antenna system for satellite communication having an economical automatic tracking capability which can automatically compensate for the variation in the direction of a satellite caused by navigation of a vessel as well as movement of the satellite.

Yet another object of the present invention is to provide an antenna system for satellite communication which sustains high electrical and mechanical reliabilities for many months and years during continuous operation under severe environmental conditions such as those on the sea, and which is also economical.

SUMMARY OF THE INVENTION

According to one feature of the present invention, there is provided an antenna system for satellite communication including a directional antenna, an antenna support device and a radome for covering the entire system, in which said antenna support system comprises a horizontal stabilized platform provided with two corrective shafts intersecting at right angles to each other, flywheel means having a spin vector that is always at right angles to a horizontal plane of said horizontal stabilized platform, first tilt detector means for converting a tilt of said horizontal stabilized platform about a first corrective shaft into an electric signal, first control means responsive to the output of said first tilt detector means for controlling a second corrective shaft, second tilt detector means for converting a tilt of said horizontal stabilized platform about the second corrective shaft into an electric signal, second control means responsive to the output of said second tilt detector means for controlling the first corrective shaft, an azimuthal shaft intersecting at right angles to the horizontal plane of the horizontal stabilized platform, third control means for controlling said azimuthal shaft, the axes of said two corrective shafts and said azimuthal shaft intersecting with each other substantially at one point, an elevational shaft intersecting at right angles to said azimuthal shaft for directing said directional antenna in the elevational direction, and fourth control means for controlling said elevational shaft, and in which said horizontal stabilized platform and any structure loaded thereon have such construction that torques induced by gravity and horizontal linear acceleration may be substantially counter-balanced within almost all the movable ranges about said corrective shafts.

According to another feature of the present invention, there is further provided in the above-featured antenna system for satellite communication, an operation unit for inputting and outputting initial value data relating to an elevational and an azimuthal angle of a satellite; a direction correcting unit for outputting fine adjustment angles for the elevational angle and the azimuthal angle, which includes an analog-digital converter for converting an analog signal received from the satellite into a digital signal, at least two registers for storing two successive outputs from said analog-digital converter, digital comparator means for comparing the outputs of said respective registers to successively output a received level difference signal, shaft selector means for successively determining a shaft to be corrected and outputting a selection signal for said azimuthal shaft or said elevational shaft, and fine adjustment angle generator means responsive to said received level difference signal for successively outputting an elevational shaft fine adjustment angle and an azimuthal shaft fine adjustment angle, said fine adjustment angle generator means effecting the fine adjustment in the same direction as the last fine adjustment when the received signal level has been increased by the last fine adjustment for the azimuthal angle or the elevational angle, but effecting the fine adjustment in the opposite direction to the last fine adjustment when the received signal level has been decreased by the last fine adjustment; an azimuthal/elevational angle unit adapted to receive data from said operation unit and said direction correcting unit for calculating and outputting an elevational angle and an azimuthal angle; elevational angle servo means responsive to said elevational angle for effecting control for the elevational shaft; compass repeater means responsive to said azimuthal angle and a compass output of a vessel for outputting an azimuthal shaft control angle; and azimuthal angle servo means responsive to said azimuthal shaft control angle for effecting control for the aximuthal shaft.

DESCRIPTION OF A PREFERRED EMBODIMENT

Figure 1:
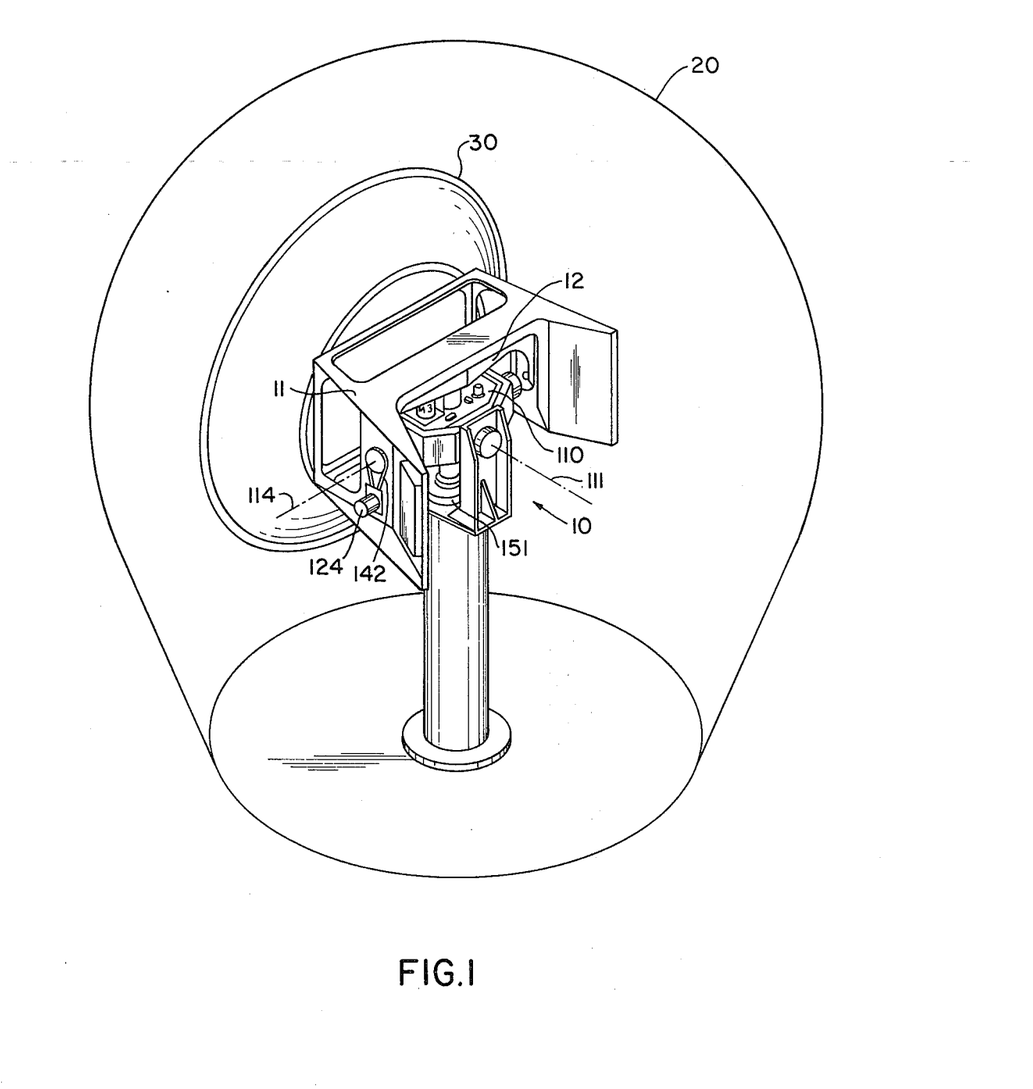
FIG. 1 is a general schematic view showing one preferred embodiment of an antenna system for satellite communication according to the present invention including a radome.

An antenna support device 10 in the antenna system for satellite communication according to the present invention is, in mechanism, of such type that at first a horizontal stabilized platform 110 is provided, having an azimuthal shaft and an elevational shaft provided thereon, and a directional antenna 30 is mounted on the elevational shaft, and the entire system is covered by a radome 20, as shown in FIG. 1.

In view of the aspects of control, the system according to the present invention is generally divided into two sections, that is, a section for controlling the horizontal stabilized platform 110 and a section for controlling the azimuthal shaft and the elevational shaft. Also, the principal features of the system according to the present invention exist in the construction and method for control of the horizontal stabilized platform and the method for control of the azimuthal shaft and elevational shaft. These features will be described in greater detail below.

Figure 2:
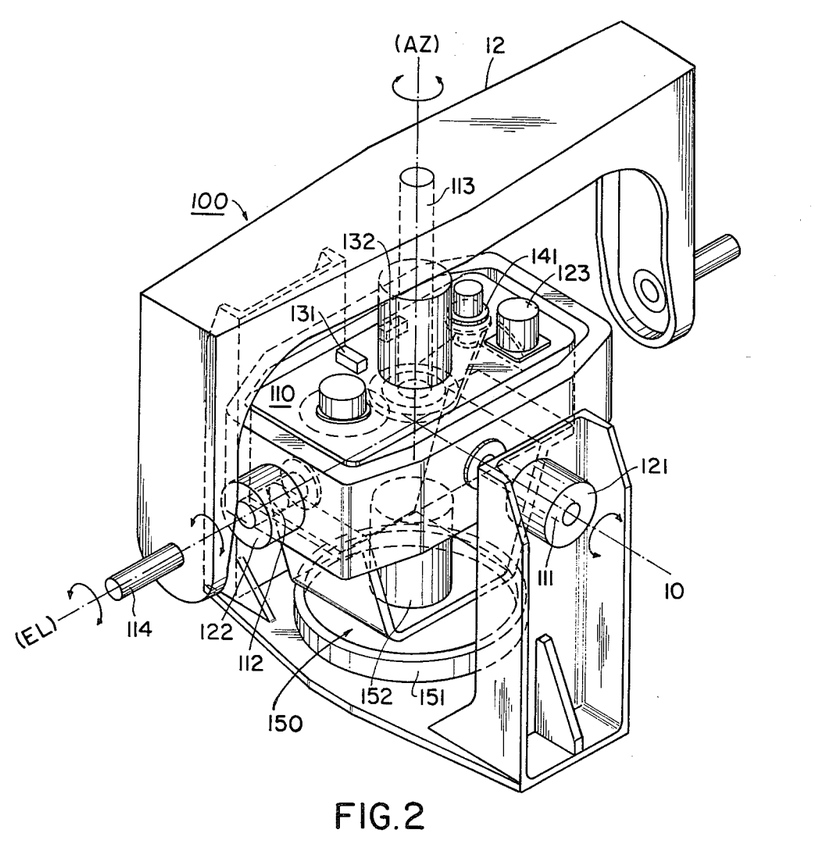
FIG. 2 is a schematic view showing a horizontal stabilized platform, an azimuthal shaft and an elevational shaft and their peripheral devices in an antenna pedestal which forms the essential part of the antenna system according to the present invention.

FIG. 2 shows a stabilized platform unit 100 which includes a horizontal stabilized platform 110 in the system according to the present invention. The platform 110 is supported so as to be rotatable about two orthogonal shafts 111 and 112 as described above, and the stabilized platform unit 100 is provided with control torque motors 121 and 122 for the respective shafts and level sensors 131 and 132 for converting tilts of the horizontal stabilized platform 110 into electric signals. In addition, a flywheel unit 150 consisting of a flywheel 151 and an electric motor 152 is mounted on the horizontal stabilized platform 110 or on an azimuthal shaft structure 12 so that its spin vector may always intersect at right angles to the horizontal plane of the horizontal stabilized platform 110, and hence the flywheel unit 150 has a gyro effect upon the horizontal stabilized platform 110.

Generally a horizontal stabilized platform damped by a pendulum weight performs precession according to Equation (5) above in response to an external disturbance torque within a small range of the tilt of the platform, as follows:

$$\Omega = N/H \approx (mAl/H) + (T_f/H) \tag{5'}$$

The horizontal stabilized platform 110 in the system according to the present invention is constructed in such manner that the first term on the right side of Equation (5)', can be neglected by achieving a balance about the shafts and thus making $m \cdot l \approx 0$. Instead, stabilization is actively achieved by means of the aforementioned level sensors 131 and 132 and torque motors 121 and 122.

With regard to the second term on the right side of Equation (5)', for the purpose of reducing the frictional torques $T_f$ about the two shafts 111 and 112 of the horizontal stabilized platform 110 it is necessary to eliminate any factor which increases the friction as much as possible, and so, the torque motors for the horizontal stabilized platform 110 are used in a direct shaft drive system without providing a speed reduction device.

While various types of torque motors are known, preferably D.C. motors or 2-phase servo motors are used. When a vessel is subjected to rolling or pitching, a frictional torque generated about a first shaft 111 will induce precession of the horizontal stabilized platform 110 about a second shaft 112 due to a gyro effect. On the contrary, a frictional torque generated about the second shaft 112 acts upon the horizontal stabilized platform 110 so as to induce precession thereof about the first shaft 111. Here, the angular velocity of the precession caused by the frictional torque is represented by the following equation as described previously:

$$\Omega_f = T_f/H \tag{6}$$

where $T_f$ represents a frictional torque, H represents an angular momentum of the flywheel 151 and $\Omega_f$ represents an angular velocity of the precession caused by the frictional torque, and hence, if the angular momentum H is sufficiently large, then the angular velocity $\Omega_f$ can be made small.

In general, frictional torques acting upon the shafts of the horizontal platform 110 will change their directions substantially in a periodic manner. This is due to the fact that the directions of rolling and pitching would vary substantially in a periodic manner. Therefore, a well-designed stabilized platform would not monotonously increase its tilt in one direction. However, since the frictional torque acting upon a shaft is not always equal in both directions, unless compensation is made, the platform would eventually tilt in one direction. Thus it will be seen that although the action of a gyro is effective for stabilizing against a high frequency component of the external disturbance torque, it is not sufficient by itself. For a low frequency component and an offset (a D.C. component) of the external disturbance torque, compensation is made by the action of the level sensors 131 and 132 and the torque motors 121 and 122.

At first, depending upon the magnitude and direction of the tilt of the horizontal stabilized platform 110 as detected by the level sensor 131, the necessary torque is generated by the torque motor 122 for driving the shaft 112. In response to this torque, the horizontal stabilized platform 110 starts precession about the shaft 111 in the direction for correcting the tilt, owing to a gyro effect. About the shaft 112 also, similar correction is made by the action of the level sensor 132 and the torque motor 121. Since the level sensors 131 and 132 respond not only to the tilts of the horizontal stabilized platform but also to the lateral linear accelerations, there is a danger that the outputs of the sensors in response to the linear accelerations will be transmitted to the torque motors, resulting in external disturbance torques. Against this shortcoming it is necessary to take measures such that motors whose own maximum torque is unnecessarily large should not be used and that the level sensors or the intermediate amplifiers therefor are made to have the characteristics of saturating at a tilt of about 10° or less from the horizontal plane. By such measures, the influence of the water hammer or the like upon the horizontal stabilized platform can be suppressed to a minimum. This is a great advantage of the present invention that cannot be expected from the antenna attitude control system relying upon a pendulum weight, and it remarkably enhances the stability and precision. Moreover, it is important for achieving almost perfect equilibrium of moments about the shafts 111 and 112 of the antenna pedestal. It is to be noted that reference numeral 12 designates an azimuthal shaft frame mounted on the horizontal stabilized platform 110, numeral 123 designates an electric motor for an azimuthal shaft 113, and in addition, an elevational shaft 114 is mounted on the azimuthal shaft frame 12.

Deterioration of the stability caused by mutual interference between the elevational shaft 114 and the two shafts 111 and 112 of the horizontal stabilized platform 110 is prevented by the provision of a multi-phase excited electric motor 124 of such type that so long as a fixed excitation state is maintained a torque for holding a stop position, that is, a restraint torque is generated, and a speed reduction mechanism 142 for amplifying the restraint torque. Such a measure is necessitated due to the fact that generally the elevational shaft 114 may possibly become parallel or nearly parallel to either one of the two shafts 111 and 112 of the stabilized platform 110.

The azimuthal shaft 113 is in a nearly orthogonal state with respect to the two shafts 111 and 112 of the stabilized platform (within a range of not so large rocking of a vessel), and hence such a measure is not always necessary. As a representative one of the multi-phase excited electric motors of the type of generating a restraint torque, those sold designated as market in the "step motor" or "pulse motor" are known and can be easily purchased at present.

Figures 3, 4:
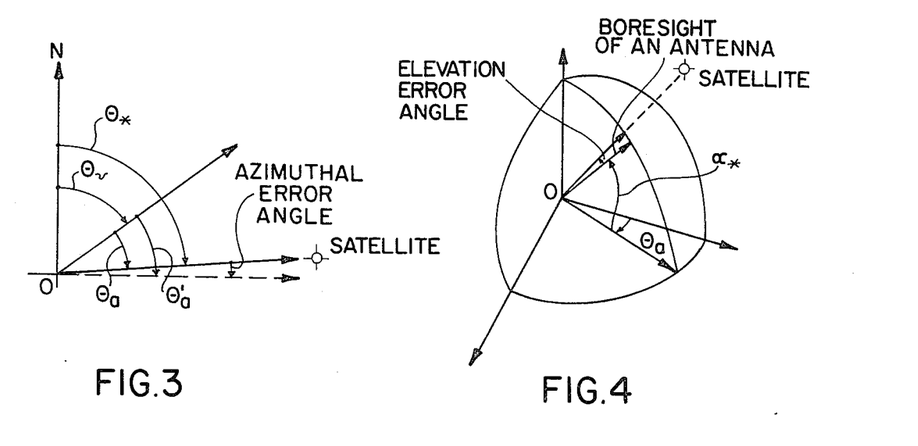
FIG. 3 is a diagram showing a principle of signal processing and calculation for an azimuthal shaft of an antenna.
FIG. 4 is a perspective view showing an azimuth/elevation coordinate system (polar coordinates)

For the rocking of the vessel, compensation is made by the horizontal stabilized platform 110 in the above-described manner. On the other hand, for the variation of the orientation of the vessel, an output $\theta_v$ of a compass of the vessel is fed into the system via a compass repeater unit 260 (FIG. 5) and an azimuth $\theta_a$ of an antenna is corrected with reference to the bow-stern direction of the vessel. The relation between an azimuth $\theta_*$ of a satellite, the heading $\theta_v$ of the vessel and the azimuth $\theta_a$ of the antenna is represented by the following equation as will be apparent from FIG. 3:

$$\theta_a = \theta_* - \theta_v \quad (7)$$

It is shown in FIG. 4 that the antenna boresight in elevation ($\alpha_*$) shall be kept nearly equal to the direction of the satellite in elevation.

With regard to the variation of the elevation of the satellite caused by perturbation of the satellite or movement of the vessel, compensation is effected by a direction correcting unit 220 (FIG. 5) as described in the following. Among the heretofore known methods for tracking a satellite by means of a large-sized directional antenna on the ground, a mono-pulse system has been predominantly used. The mono-pulse system is very excellent in tracking performance.

However, in the case of tracking by means of a relatively small directional antenna, the mono-pulse system cannot always be said to be an economical system. This is because generally four or more antenna elements and a receiver channel for tracking use (separately from a receiver channel for communication use) are necessitated in the mono-pulse system.

A tracking (direction correcting) system proposed herein is an economical tracking (direction correcting) system that is well adapted to the attitude control system for an antenna according to the present invention, in which neither a special type of antenna nor a receiver channel solely for use in tracking is necessitated, and by merely branching a received level signal corresponding to a received electric field strength from a main receiver channel for communication use, the branched signal can be used as a tracking signal.

The proposed system is, principally, one kind of trial-and-error process, and the process consists of the following steps:

Step-(1): The direction of the antenna is shifted a little.

Step-(2): Whether the received electric field intensity has been increased or decreased, is determined.

Step-(3): If the received electric field has been increased, then the direction of the antenna is further shifted a little in the same direction, but if the received electric field has been decreased, then the direction of the antenna is shifted a little in the opposite direction to the last shift, and again the process is returned to Step-(2) above.

Subsequently, Step-(2) and Step-(3) are repeatedly executed with respect to the azimuthal shaft and the elevational shaft, and thereby the antenna would track the satellite towards the higher received electric field intensity in a trial-and-error fashion. Sometimes such a tracking process is called "step track".

The characteristics of this system are summarized as follows:

(a) The system is economical owing to the fact that no special antenna structure for tracking is necessitated, that is, owing to the fact that a special structure for forming a multi-beam or for rotating a beam as will be seen in the mono-pulse system or in the conical scan system is unnecessary.

(b) A separate receiver channel for tracking use is not required, but it is only necessary to branch out a part of the signal from the receiver channel in the main communication system and to feed it to a direction correcting unit.

(c) Since the tracking operation is intermittent and also small in movement, the influence of the reaction of movement of the elevational shaft upon the stability of the stabilized platform 110 is very small.

(d) The tracking speed is slow as compared to the above-described two systems, i.e., the mono-pulse system and the conical scan system. Therefore, in many cases the proposed system is not suitable for tracking of a high-speed flying body. However, in case of the satellite communication, in most instances a satisfactory result can be obtained with relatively slow tracking.

The above-described characteristics of the proposed tracking process prove that it is quite well adapted to the novel construction of the antenna support device and antenna attitude control unit according to the first feature of the present invention.

Figure 5:
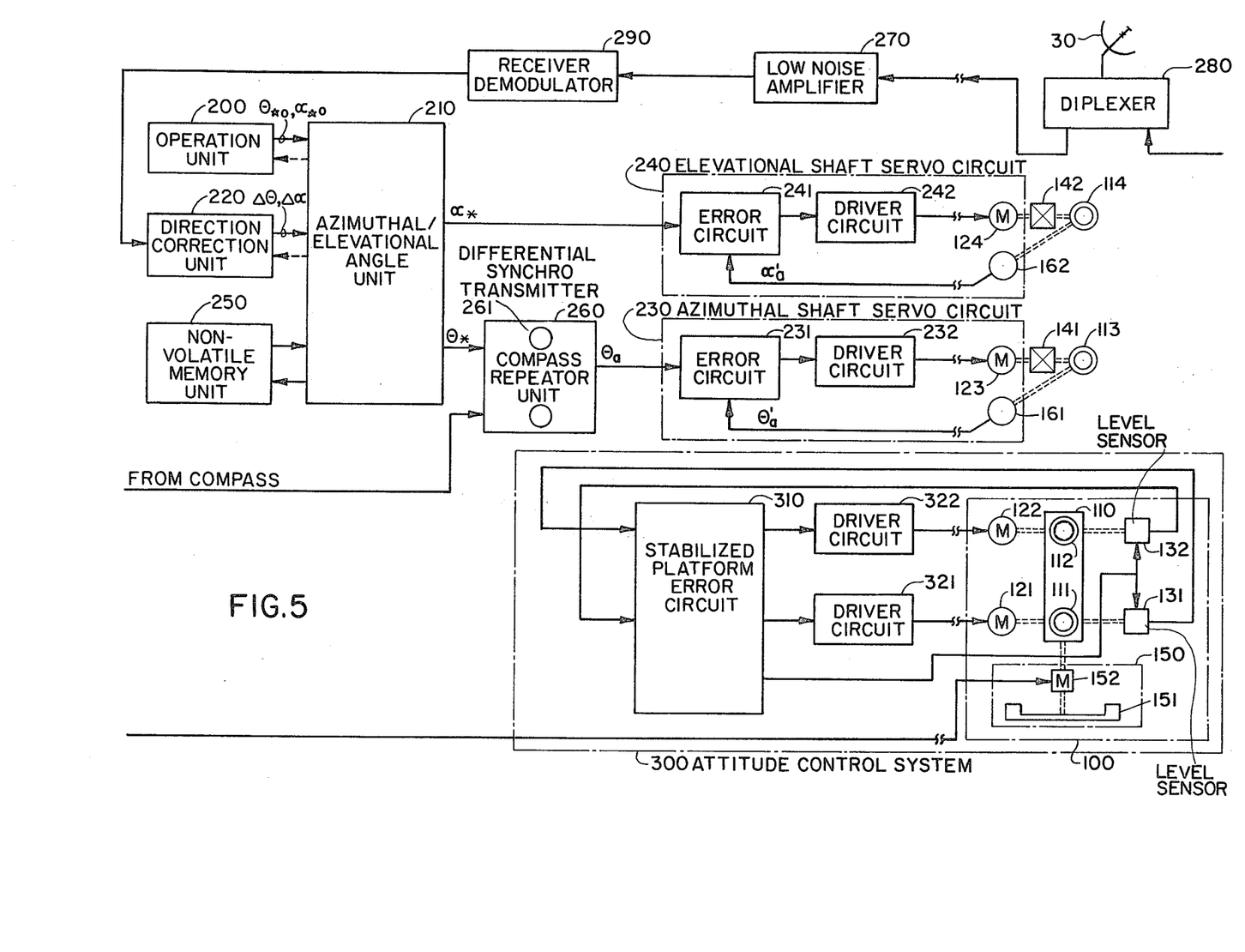
FIG. 5 is a block diagram showing the construction of the entire system according to the present invention.

FIG. 5 is a block diagram showing the construction of the entire system including an antenna pedestal control section according to one preferred embodiment of the present invention. The operation of the subject system will be described with reference to this figure. Reference numeral 300 designates an attitude control system, in which for the purpose of providing a gyro effect, a flywheel unit 150 is fixedly secured to a horizontal stabilized platform 110. In the flywheel unit 150, a flywheel 151 is driven into rotation by means of an electric motor 152 to attain a necessary angular momentum. In addition, as tilt detector means for converting the tilts of the stabilized platform 110 into electric signals, level sensors 131 and 132 are provided, and when 2-phase excitation voltages having a phase difference of 180° are fed from an oscillator 313 (FIG. 6) to these level sensors 131 and 132, A.C. signals corresponding to the tilt angles and the directions of tilts of the stabilized platform 110 are output from the output terminals of the respective level sensors 131 and 132.

Figure 6:
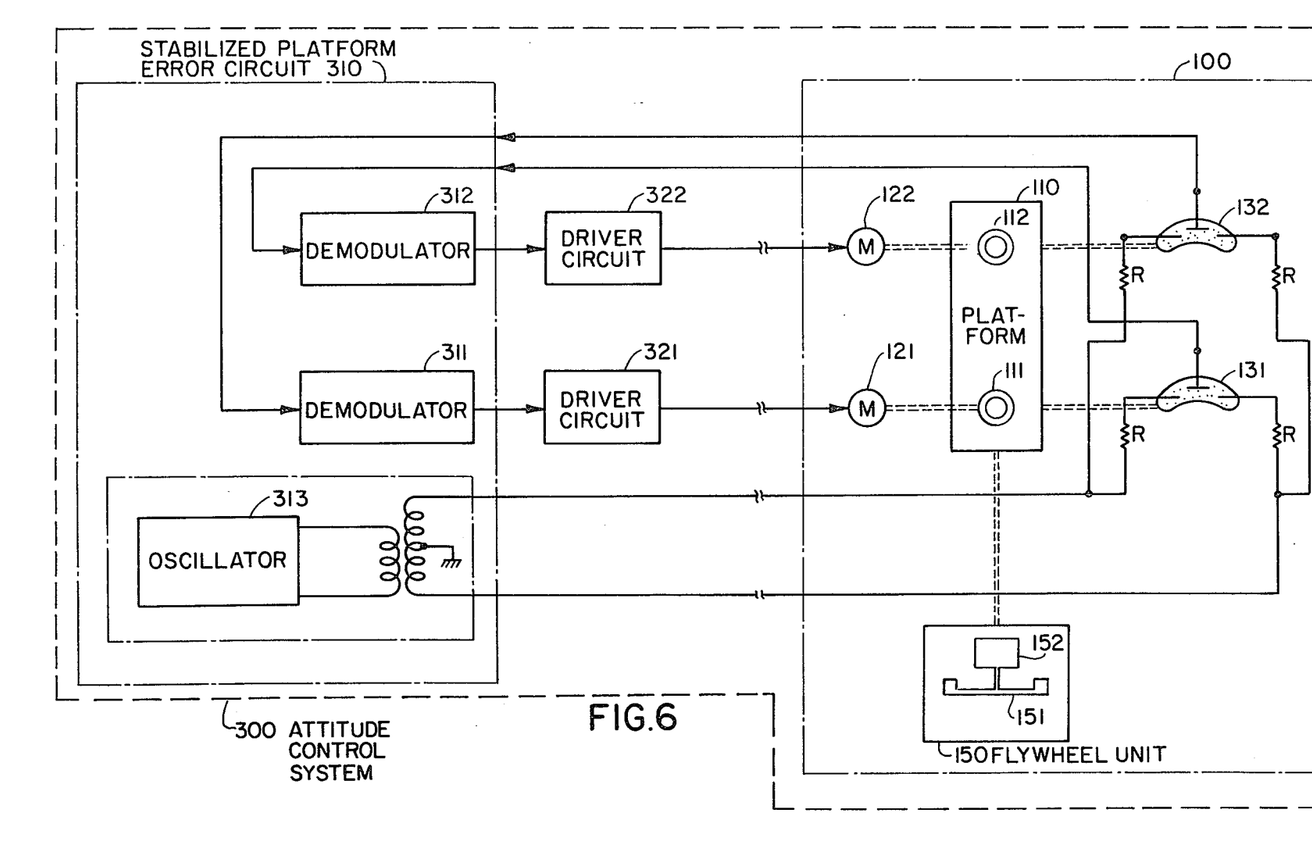
FIG. 6 is a block diagram showing the details of the attitude control unit represented by a block 300 in FIG. 5.

The outputs of the level sensors 131 and 132 which represent the directions and magnitudes of the tilts of the horizontal stabilized platform 110 are demodulated by demodulators 311 and 312 in a stabilized platform error circuit 310 shown in FIG. 6, and then fed to driver circuits 321 and 322, respectively. The driver circuits 321 and 322 amplify the outputs of the demodulators 311 and 312 which represent the directions and magnitudes of the tilts of the horizontal stabilized platform 110, and the amplified outputs drive direct-shaft-drive type torque motors 121 and 122, respectively, which are directly coupled to shafts 111 and 112 without the intermediary of a speed reduction mechanism, in the directions for reducing the magnitudes of the tilts of the horizontal stabilized platform 110. In this instance, taking into consideration the gyro effect of the flywheel 151, the signal obtained by demodulating and amplifying the output of the level sensor 131 which represents the tilt of the stabilized platform 110 about the shaft 111, is applied to the torque motor 122 for controlling the shaft 112, while the signal obtained by demodulating and amplifying the output of the level sensor 132 which represents the tilt of the stabilized platform about the shaft 112, is applied to the torque motor 121 for controlling the shaft 111. This is a distinct difference from the heretofore known servo stabilized platform system relying upon attitude sensors and servo motors without employing a flywheel. In this connection, in the case of employing a D.C. output type inclinometer as tilt detector means in a modified embodiment, it is only necessary that D.C. amplifiers are used in place of the demodulators 311 and 312 and instead of the two opposite-phase excitation voltages a sufficiently stabilized D.C. voltage is applied to the inclinometers. In this modified case, the circuit arrangement becomes simpler than that shown in FIG. 6, and so it will be easily appreciated by analogy without illustration.

Figure 7:
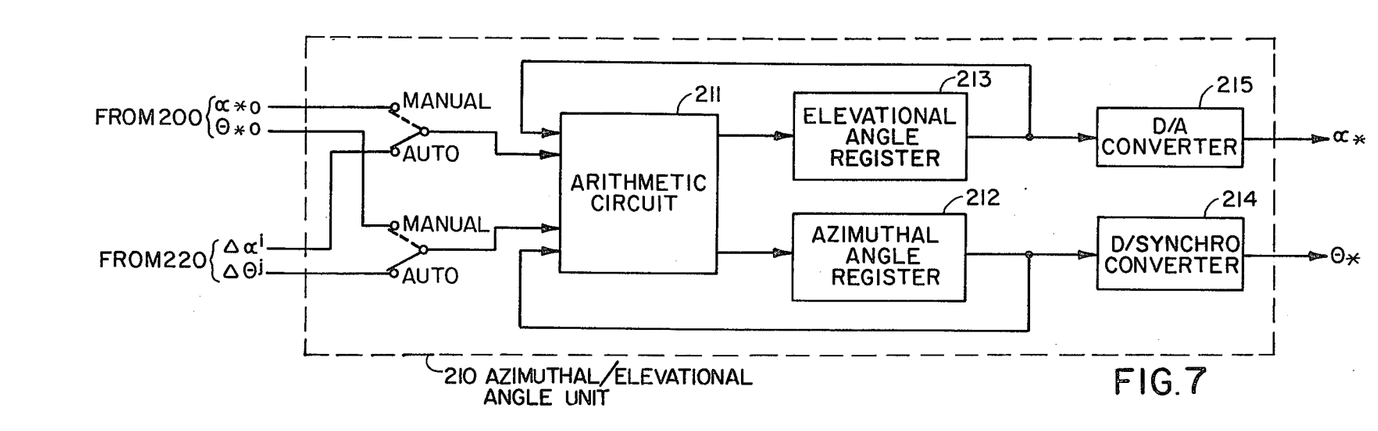
FIG. 7 is a block diagram showing the details of the azimuthal/elevational angle unit represented by a block 210 in FIG. 5.

Now description will be made principally on the azimuthal/elevational angle unit 210. As a first input to the azimuthal/elevational angle unit 210, at least two initial value data relating to the direction of the satellite, that is, an azimuthal angle initial value $\theta *_0$ and an elevational angle initial value $\alpha *_0$ are fed from an operation unit 200. These data are manually input from a switch or a keyboard in the operation unit 200. It is to be noted that among the information in the azimuthal/elevational angle unit 210 and the operation unit 200, at least an azimuthal angle $\theta *$ and an elevational angle $\alpha *$ are stored in a non-volatile memory unit 250 to prevent disappearance of data caused by power failure accidents or the like. In addition, fine adjustment angles $\Delta \theta$ and $\Delta \alpha$ for the azimuthal angle and elevational angle are fed from the direction correcting unit 220 to the azimuthal-/elevational unit 210. These information items are stored in an azimuthal angle register 212 and an elevational angle register 213 after they have been processed in an arithmetic circuit 211, as shown in FIG. 7 which shows the details of the azimuthal/elevational angle unit 210. The azimuthal/elevational angle unit 210 includes the elevational angle register 213, the arithmetic circuit 211 and a digital-analog converter 215, and a first important operation of the unit 210 making use of these components is generation of an elevational angle $\alpha *$.

In a sequence of operation steps for generating an elevational angle $\alpha *$, an elevational angle $\alpha *^i$ resulting from the i-th operation step is obtained by adding an i-th fine adjustment angle $\Delta \alpha_i$ to the value of $\alpha *$ resulting from the (i−1)-th operation step, that is, $\alpha *^{i-1}$. In other words, the i-th elevational angle $\alpha *^i$ is represented by the equation $\alpha *^i = \alpha *^{i-1} + \Delta \alpha_i$ (i=1, 2, 3, ... ). In the following, it is assumed that when the elevational angle is represented generally regardless of the step number i, the suffix i is omitted.

The calculation represented by the right side of the above equation is executed by the arithmetic circuit 211 in FIG. 7. The obtained elevational angle $\alpha *$ is applied to an elevational shaft servo circuit 240 as a command value for an elevational shaft servo system. The elevational shaft servo circuit 240 comprises an error circuit 241, a driver circuit 242, an elevational shaft motor 214, an elevational shaft angle detector 162 and a speed reduction mechanism 142 interposed between the motor 124 and the elevational shaft 114, and as the elevational shaft motor 124, an electric motor of the type having a strong position retaining torque is used to form a stable servo system. The elevational shaft error circuit 241 derives a difference between the elevational angle $\alpha *$ fed from the azimuthal/elevational angle unit 210 and an angle $\alpha_a'$ represented by an output of an elevational shaft angle detector 162 and outputs an error signal to the driver circuit 242.

The other important operation of the azimuthal/elevational angle unit 210 is generation of an azimuthal angle $\theta *$, and in order to achieve this operation the unit 210 includes the azimuthal angle register 212, the arithmetic circuit 211 and a digital-synchro converter 214 for converting the contents of the azimuthal angle register 212 (digital data) into an analog signal (a synchro signal).

In a sequence of operation steps for generating an azimuthal angle $\theta *$, an azimuthal angle $\theta *^j$ resulting from the j-th operation step is obtained by adding a j-th fine adjustment angle $\Delta \theta_j$ to the value of $\theta *$ resulting from the (j−1)-th operation step, that is, $\theta *^{j-1}$. In other words, the j-th elevational angle $\theta *^j$ is represented by the equation $\theta *^j = \theta *^{j-1} + \Delta \theta_j$ (j=1, 2, 3, ... ). In the following, it is assumed that when the azimuthal angle is represented generally regardless of the step number j, it is represented by $\theta *$ omitting the suffix j.

The calculation represented by the right side of the above equation is executed by the arithmetic circuit 211 in FIG. 7. Since the azimuthal angle of the satellite is stored in the azimuthal register 212 in the form of digital data, these digital data are converted into an analog (synchro) signal by the digital-synchro converter 214, and thereafter it is fed to a compass repeater unit 260.

The compass repeater unit 260 comprises a repeater motor (or a torque type synchro-motor), a differential synchro transmitter 261 and a speed reduction mechanism, which are arranged in such a manner that variation of the azimuth of the vessel is transmitted via the repeater motor to the shaft of the differential synchro transmitter 261.

The compass repeater unit 260 responds to the output signal $\theta *$ from the digital-synchro converter 214 in the azimuthal/elevational angle unit 210 for outputting a signal corresponding to a control command angle $\theta_a$ of the azimuthal shaft 113. Here it is to be noted that the relation of $\theta_a = \theta * - \theta_v$ is established as shown in FIGS. 3 and 4.

The output of the compass repeater unit 260 is applied to an azimuthal shaft servo circuit 230. The azimuthal shaft servo circuit 230 comprises an error circuit 231, a driver circuit 232, an azimuthal shaft motor 123, an azimuthal shaft angle detector 161 and a speed reduction mechanism 141 to form an azimuthal shaft servo system. In this circuit 230, the azimuthal shaft error circuit 231 derives a difference between a shaft control angle $\theta_a$ fed from the compass repeater unit 260 and an angle $\theta_a'$ represented by the output from the azimuthal shaft angle detector 161, and outputs the difference signal to the driver circuit 232.

Figure 8:
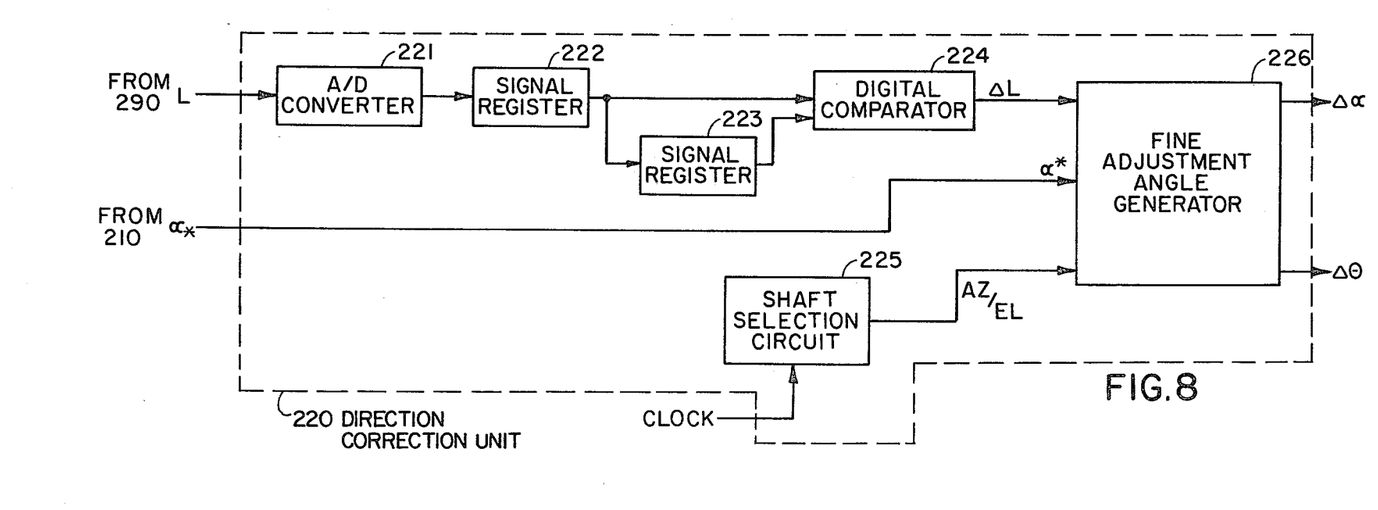
FIG. 8 is a block diagram showing the details of the direction correcting unit represented by a block 220 in FIG. 5.

Now description will be made of the direction correcting unit 220 with reference to FIG. 5 and FIG. 8 which show the direction correcting unit 220 in greater detail.

A received level signal L corresponding to the received electric field intensity, which has been derived by a receiver demodulator 290 after being received by a directional antenna 30 shown in FIG. 5 and amplified by a low-noise amplifier 270 after passing through a diplexer 280, is fed to the direction correcting unit 220. As shown in FIG. 8, the direction correcting unit 220 comprises an analog-digital converter 221 for converting a received level signal L (analog signal) into a digital signal, a register 222 for storing a k-th received level signal $L^k$ (k=1, 2, 3, ...) in the form of a digital signal, another register 223 for storing the last, i.e., the (k−1)-th received level signal $L^{(k-1)}$, a digital comparator 224 for comparing the contents in the respective registers to each other and outputting a signal representing a difference between the contents in the respective resisters, that is, a received level difference signal $\Delta L$, and a shaft selection circuit 225 for outputting a selection signal AZ/EL for the azimuthal shaft and elevational shaft. Moreover, the unit 220 comprises a fine adjustment angle generator circuit 226 which responds to the output of the digital comparator 224, that is, the received level difference signal $\Delta L$, the elevational angle data $\alpha*$ and the output AZ/EL from the shaft selection circuit 225, for outputting an elevational shaft fine adjustment angle $\Delta \alpha$ and an azimuthal angle fine adjustment angle $\Delta \theta$, and thereby it forms an automatic tracking unit.

If fine adjustment is performed simultaneously with respect to the elevational shaft and the azimuthal shaft, then the effects will overlap and will make the determination of the next fine adjustment angles complex and difficult. Therefore the fine adjustment with respect to the azimuthal shaft and with respect to the elevational shaft are carried out separately. The shaft selection circuit 225 effects selection of the shaft to be subjected to fine adjustment. It can be constructed of a single flip-flop or a counter consisting of a number of flip-flops and a decoder.

In the simplest case, it can be formed by inputting an appropriate clock to a single (T-type) flip-flop. Since the flip-flop is inverted by every clock pulse, if the "Q" output and the "$\overline{Q}$" output of flip-flop are used, for example, as an azimuthal shaft selection signal and an elevational shaft selection signal, respectively, then the fine adjustment is executed alternately with respect to the azimuthal shaft and with respect to the elevational shaft.

In case where it is desired to execute fine adjustment for the azimuthal shaft n times for one execution of fine adjustment for the elevational shaft, it is only necessary to form a counter and decode the state of the counter while inputting an appropriate clock thereto so that the decoded output may be distributed as the elevational shaft selection signal and the azimuthal shaft selection signal.

Prior to explanation of a fine adjustment angle generator circuit 226, various notations are defined as follows:

$\Delta \alpha^i$: i-th fine adjustment angle for the elevation (i=1, 2, 3, ...)

$\Delta \theta^j$: j-th fine adjustment angle for the azimuth (j=1, 2, 3, ...)

$\Delta L_E^i$: received level difference signal resulted from $\Delta \alpha^i$ $\Delta L_A^j$: received level difference signal resulted from $\Delta \theta^j$ sgn xxx: sign of the data xxx The determination of the signs of the fine adjustment angles $\Delta \alpha$ and $\Delta \theta$ generated by the fine adjustment angle generator circuit 226 is effected according to the following rules:

$$\mathrm{sgn}\Delta\alpha^i = \mathrm{sgn}\Delta\alpha^{i-1} \cdot \mathrm{sgn}\alpha L_E^j \qquad (8)$$

$$\mathrm{sgn}\Delta\theta^j = \mathrm{sgn}\Delta\theta^{j-1} \cdot \mathrm{sgn}\Delta L_A^j \qquad (9)$$

In other words, when the received signal level L has been increased after the last fine adjustment $\Delta \alpha^{i-1}$, the sign of the next fine adjustment angle $\Delta \alpha^i$ is identical to that of $\Delta \alpha^{i-1}$, but when the received signal level L has been decreased, the sign of the next fine adjustment angle $\Delta \alpha^i$ is opposite to that of $\Delta \alpha^{i-1}$. The same is also true with respect to the fine adjustment angle $\Delta \theta^j$ for the azimuthal shaft.

Upon constructing the direction correcting unit 220 and the azimuthal/elevational angle unit 210, if micro computers, random access memories and read-only memories are employed in the assembly, elaborate design would become possible. In such a case, the registers, digital comparator 224, arithmetic circuit, etc. in the direction correcting unit 220 and the azimuthal/elevational unit 210 are formed in the micro computer or in the random access memory.

As described above, according to the present invention owing to the characteristic features of (1) level sensors and a motor-driven gyro rotary body being employed in combination and an amplifier being designed to have saturation characteristics for the purpose of controlling a horizontal stabilized platform, (2) drive of an X-shaft and a Y-shaft for controlling rolling and pitching, respectively, being effected by direct coupling to motors, and (3) a simple automatic tracking system being constructed for directing an antenna towards a satellite, there are provided many advantages such as (1) maintenance of a horizontal position of the horizontal stabilized platform is sure, (2) absorption of water hammers is achieved owing to the saturation characteristics of the amplifier, and (3) owing to simple digitization the construction becomes simple and the cost can be reduced.

We claim:

1. An antenna system for satellite communication including a directional antenna (30), an antenna support device (10) and a radome (20) for covering the entire system, characterized in that said antenna support device (10) comprises:

a horizontal stabilized platform (110) provided with two corrective shafts intersecting at right angles to each other;

flywheel means (150) having a spin vector that is always at right angles to a horizontal plane of said horizontal stabilized platform (110);

first tilt detector means (131) for converting a tilt of said horizontal stabilized platform (110) about the first corrective shaft (111) into an electric signal, and first control means (122) responsive to the output of said first tilt detector means (131) for controlling the second corrective shaft (112);

second tilt detector means (132) for converting a tilt of said horizontal stabilized platform (110) about the second corrective shaft (112) into an electric signal, and second control means (121) responsive to the output of said second tilt detector means (132) for controlling the first corrective shaft (111);

an azimuthal shaft (113) intersecting at right angles to the horizontal plane of said horizontal stabilized platform (110), third control means for controlling said azimuthal shaft (113), the axes of said two corrective shafts (111, 112) and said azimuthal shaft (113) intersecting with each other substantially at one point; and an elevational shaft (114) intersecting at right angles to said azimuthal shaft (113) for directing said directional antenna (30) in the elevational direction, and fourth control means for controlling said elevational shaft (114);

and that said horizontal stabilized platform (110) and a structure loaded thereon have such construction that torques induced by a gravity and a horizontal linear acceleration may be substantially counter-balanced within almost all the movable ranges about said corrective shafts (111, 112).

2. An antenna system for satellite communication as claimed in claim 1, wherein said elevational shaft control means (124) is an electric motor of such type that under an energized condition it generates a restraint torque for holding a stopped position, and speed reduction means (142) is provided between the electric motor (124) and the elevational shaft (114).

3. An antenna system for satellite communication as claimed in claim 1 or 2, further comprising control electric motors (121, 122) directly connected to the two corrective shafts (111, 112), respectively, of said horizontal stabilized platform (110).

4. An antenna system for satellite communication as claimed in claim 3, wherein said first and second tilt detector means for converting a tilt of said horizontal stabilized platform (110) into an electric signal are such that they may be saturated at tilt angles smaller than about 10°.

5. An antenna system for satellite communication as claimed in claim 4, further comprising:
an operation unit (200) for inputting and outputting initial value data relating to an elevational angle and an azimuthal angle of a satellite;
a direction correcting unit (220) for outputting fine adjustment angles for the elevational angle and the azimuthal angle, which includes:
an analog-digital converter (221) for converting an analog signal received from the satellite into a digital signal,
at least two registers (222, 223) for storing two successive outputs $L^{k-1}$, $L^k$ ($k=1, 2, 3, \ldots$) from said analog-digital converter (221),
digital comparator means (224) for comparing the contents of said respective registers to successively output a received level difference signal $\Delta L^k$ ($k=1, 2, 3, \ldots$),
shaft selector means (225) for successively determining a shaft to be corrected and outputting a selection signal AZ/EL for said azimuthal shaft (113) or said elevational shaft (114), and
fine adjustment angle generator means (226) responsive to said received level difference signal $\Delta L^k$ ($k=1, 2, 3, \ldots$) for successively outputting an elevational shaft fine adjustment angle $\Delta \alpha^i$ ($i=1, 2, 3, \ldots$) and an azimuthal shaft fine adjustment angle $\Delta \theta^j$ ($j=1, 2, 3, \ldots$), said fine adjustment angle generator means (226) effecting the fine adjustment in the same direction as the last fine adjustment when the received signal level has been increased by the last fine adjustment for the azimuthal angle or the elevational angle, but effecting the fine adjustment in the opposite direction to the last fine adjustment when the received signal level has been decreased by the last fine adjustment;

an azimuthal/elevational angle unit (210) adapted to receive data from said operation unit (200) and said direction correcting unit (220) for calculating and outputting an elevational angle $\alpha*$ and an azimuthal angle $\theta*$;

elevational angle servo means (240) responsive to said elevational angle $\alpha*$ for effecting control for the elevational shaft;

compass repeater means (260) responsive to said azimuthal angle $\theta*$ and a compass output $\theta_v$ of a vessel for outputting an azimuthal shaft control angle $\theta_a$ ($=\theta*-\theta_v$); and azimuthal angle servo means (230) responsive to said azimuthal shaft control angle $\theta_a$ for effecting control for the azimuthal shaft.

6. An antenna system for satellite communication as claimed in claim 5, wherein said azimuthal/elevational angle unit (210) includes non-volatile memory means (250) for storing at least said elevational angle $\alpha*$ and azimuthal angle $\theta*$ in a non-volatile manner.

7. An antenna system for satellite communication as claimed in claim 1 or 2, wherein said first and second tilt detector means for converting a tilt of said horizontal stabilized platform (110) into an electric signal are such that they may be saturated at tilt angles smaller than about 10°.

8. An antenna system for satellite communication as claimed in claim 1 or 2, further comprising:
an operation unit (200) for inputting and outputting initial value data relating to an elevational angle and an azimuthal angle of a satellite;
a direction correcting unit (220) for outputting fine adjustment angles for the elevational angle and the azimuthal angle, which includes:
an analog-digital converter (221) for converting an analog signal received from the satellite into a digital signal,
at least two registers (222, 223) for storing two successive outputs $L^{k-1}$, $L^k$ ($k=1, 2, 3, \ldots$) from said analog-digital converter (221),
digital comparator means (224) for comparing the contents of said respective registers to successively output a received level difference signal $\Delta L^k$ ($k=1, 2, 3, \ldots$),
shaft selector means (225) for successively determining a shaft to be corrected and outputting a selection signal AZ/EL for said azimuthal shaft (113) or said elevational shaft (114), and
fine adjustment angle generator means (226) responsive to said received level difference signal $\Delta L^k$ ($k=1, 2, 3, \ldots$) for successively outputting an elevational shaft fine adjustment angle $\Delta\alpha^i$ ($i=1, 2, 3, \ldots$) and an azimuthal shaft fine adjustment angle $\Delta\theta^j$ ($j=1, 2, 3, \ldots$), said fine adjustment angle generator means (226) effecting the fine adjustment in the same direction as the last fine adjustment when the received signal level has been increased by the last fine adjustment for the azimuthal angle or the elevational angle, but effecting the fine adjustment in the opposite direction to the last fine adjustment when the received signal level has been decreased by the last fine adjustment;

an azimuthal/elevational angle unit (210) adapted to receive data from said operation unit (200) and said direction correcting unit (220) for calculating and outputting an elevational angle $\alpha*$ and an azimuthal angle $\theta*$;

elevational angle servo means (240) responsive to said elevational angle $\alpha*$ for effecting control for the elevational shaft;

compass repeater means (260) responsive to said azimuthal angle $\theta*$ and a compass output $\theta_v$ of a vessel for outputting an azimuthal shaft control angle $\theta_a$ ($=\theta* -\theta_v$); and azimuthal angle servo means (230) responsive to said azimuthal shaft control angle $\theta_a$ for effecting control for the azimuthal shaft.

9. An antenna system for satellite communication as claimed in claim 3, further comprising:

an operation unit (200) for inputting and outputting initial value data relating to an elevational angle and an azimuthal angle of a satellite;

a direction correcting unit (220) for outputting fine adjustment angles for the elevational angle and the azimuthal angle, which includes:

an analog-digital converter (221) for converting an analog signal received from the satellite into a digital signal, at least two registers (222, 223) for storing two successive outputs $L^{k-1}$, $L^k$ ($k=1, 2, 3, \ldots$) from said analog-digital converter (221), digital comparator means (224) for comparing the contents of said respective registers to successively output a received level difference signal $\Delta L^k$ ($k=1, 2, 3, \ldots$), shaft selector means (225) for successively determining a shaft to be corrected and outputting a selection signal AZ/EL for said azimuthal shaft (113) or said elevational shaft (114), and fine adjustment angle generator means (226) responsive to said received level difference signal $\Delta L^k$ ($k=1, 2, 3, \ldots$) for successively outputting an elevational shaft fine adjustment angle $\Delta\alpha^i$ ($i=1, 2, 3, \ldots$) and an azimuthal shaft fine adjustment angle $\Delta\theta^j$ ($j=1, 2, 3, \ldots$), said fine adjustment angle generator means (226) effecting the fine adjustment in the same direction as the last fine adjustment when the received signal level has been increased by the last fine adjustment for the azimuthal angle or the elevational angle, but effecting the fine adjustment in the opposite direction to the last fine adjustment when the received signal level has been decreased by the last fine adjustment;

an azimuthal/elevational angle unit (210) adapted to receive data from said operation unit (200) and said direction correcting unit (220) for calculating and outputting an elevational angle $\alpha*$ and an azimuthal angle $\theta*$;

elevational angle servo means (240) responsive to said elevational angle $\alpha*$ for effecting control for the elevational shaft;

compass repeater means (260) responsive to said azimuthal angle $\theta*$ and a compass output $\theta_v$ of a vessel for outputting an azimuthal shaft control angle $\theta_a$ ($=\theta* -\theta_v$); and azimuthal angle servo means (230) responsive to said azimuthal shaft control angle $\theta_a$ for effecting control for the azimuthal shaft.

* * * * *